J. R. BROWN.
SCREW CUTTING MACHINE.
No. 51,257. Patented Nov. 28, 1865.
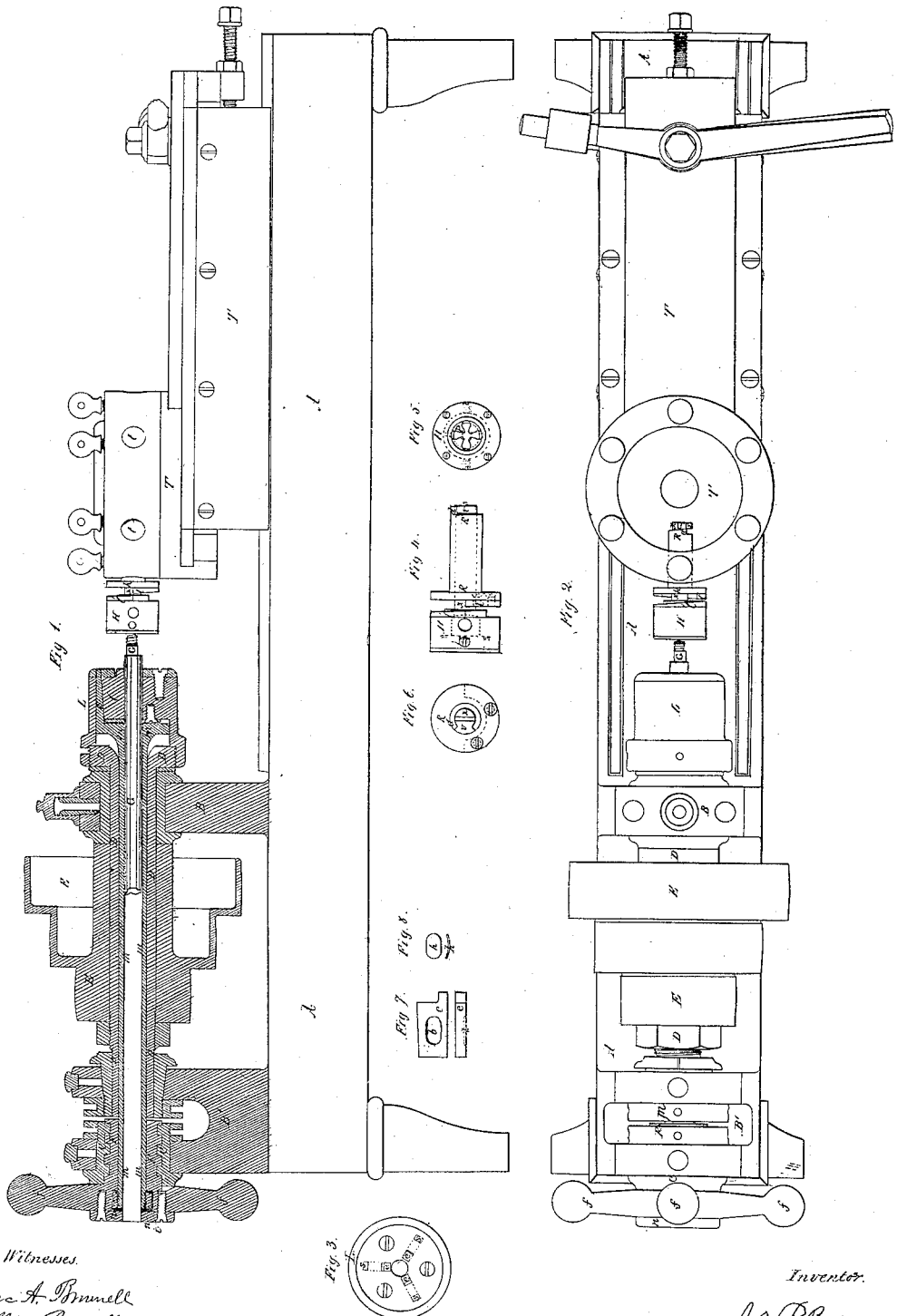

UNITED STATES PATENT OFFICE.

JOSEPH R. BROWN, OF PROVIDENCE, RHODE ISLAND, ASSIGNOR TO JOSEPH R. BROWN & SHARPE.

IMPROVEMENT IN SCREW-CUTTING MACHINES.

Specification forming part of Letters Patent No. 51,257, dated November 28, 1865.

*To all whom it may concern:*

Be it known that I, JOSEPH R. BROWN, of Providence, in the county of Providence and State of Rhode Island, have invented a new and useful Improvement in Screw-Cutting Machines; and I do hereby declare that the following is a full, clear, and exact description of the same, reference being had to the accompanying drawings, making part of this specification, in which—

Figure 1 is a side elevation and section of a machine embodying my improvement. Fig. 2 is a plan of the same. Fig. 3 is a front elevation of the chuck hereinafter described. Fig. 4 is a longitudinal view of my improved holder for holding the screw-threading tool. Fig. 5 is a front view of the same. Fig. 6 is a view of the rear end of the same. Figs. 7 and 8 are details of the jaws of my improved chuck.

Similar letters of reference indicate corresponding parts in all the figures.

My said improvement relates, first, to the means by which the rod or piece of metal from which the screw is to be formed is griped and held at the end of a revolving spindle; and it consists in combining with suitable griping-jaws a set of wedges at the end of a rod or tube within the spindle, and a rotating screw for imparting a sliding movement longitudinally to the said rod or tube and the wedges thereon, so that the wedges are made to force the griping-jaws together to gripe the rod or piece of metal, and afterward to liberate the same while the spindle is revolving.

My improvement relates, secondly, to the means employed to hold and control the operation of the threading-tool; and it consists in combining a tool-holder capable of holding a tap or die or other suitable threading-tool with a reversible clutch in such a manner that the holder and tool may slide and cut the screw-thread up to a given point, and then be liberated by the clutch and revolve with the threaded-screw until the revolution of the spindle is reversed, when the tool-holder is arrested and held from turning while the tool is being withdrawn from the threaded screw.

To enable others skilled in the art to make and use my invention, I will proceed to describe the same.

In the accompanying drawings, A is the ed of a screw-cutting lathe. B B' constitute the head-stock of the same, in which are formed suitable bearings for the spindle D, which is revolved therein by means of a belt or band running on the cone-pulleys E from an overhead shaft fitted with a reversible driving-gear, so that the spindle D may be revolved in either direction at will.

As represented, the spindle D is hollow, so that the rod or piece of metal G may be introduced at and extend to some length beyond the rear end of the spindle, while one end is held and being operated upon at the front end of the spindle.

On the front end of the spindle D there is a chuck, L, consisting of a hub and shell, which is shown in Figs. 1, 2, and 3, and which incloses three or other number of steel jaws, $e\,e\,e$, (shown separately in Fig. 7,) that slide radially in recesses formed in said hub, toward and from the center thereof, by means of a set of wedges, $s\,s\,s$, on the end of the tube $m$, Figs. 1 and 2, which slide lengthwise between said jaws and the shell of the chuck simultaneously. The tube $m$, upon the end of which these wedges are formed, extends through the rear end of the spindle and through a hollow screw, F, arranged to turn in a fixed nut, $c$, in the head-stock B', there being on the end of the tube $m$ a screw-collar, $i$, occupying a circular recess formed in the rear end of the hollow screw F and covered by the plate $n$, by means of which collar the tube $m$ is so confined to the hollow screw F that by turning said screw in its nut $c$ the tube is made to slide longitudinally within the spindle, and by means of the wedges at the opposite end thereof to operate the griping-jaws $e\,e\,e$ of the chuck, the tube at the same time revolving in the hollow screw with the movements of the spindle.

Thus constructed, the operation is that, with the metal rod G introduced at the rear end and protruding through the chuck to the required extent for forming a screw at the end, while the spindle is revolving, the hollow screw F is turned by means of the projections $f$ thereon and screwed into its nut, sliding the tube $m$ and wedges $s\,s\,s$ forward, and thereby forcing the jaws e e e together and against the rod G, and griping it firmly, causing it to revolve with the spindle, and after the screw is formed and cut from the rod G the bottom screw, F, is turned in the opposite direction, thereby withdrawing the wedges from behind the griping-jaws and liberating the rod G, when it may be pushed through the chuck sufficiently for the formation of another screw at its end, when the rod is again griped by the jaws of the chuck, and the operation of forming another screw follows, the spindle revolving all the time, and continuing until the entire rod G is converted into screws.

The spring $h$, Fig. 8, is inserted in the recess $b$ of the jaws, Fig. 7, and exerts a sufficient pressure against the sides of the recess in which the jaws $e$ slide to hold the jaws suspended therein by friction in the absence of the object to be griped by said jaws.

In threading screws and in tapping it is often desirable to cut the thread up to a shoulder or to a given point, or to run the tap in up to a shoulder or a given distance, and positively no farther, and this is necessarily quite a difficult and delicate operation, requiring great expertness to avoid breaking the threading-tool. The second feature of my improvement is calculated to remedy this difficulty and to avoid any possibility of breaking the tool without regard to the expertness with which it is operated. This is accomplished by means of the tool-holder H, Figs. 2, 4, 5, and 6, inclosing a die, $p$, for threading the screw, and formed with a spindle, $x$, which is inclosed within the sleeve of the reversible clutch R, said sleeve being secured in a suitable socket, $t$, on the sliding carriage T of the lathe, Figs. 1 and 2. At one end of said sleeve there is a disk having a jaw, $l$, which clutches with the corresponding jaw, $l$, on the tool-holder. Likewise at the opposite end of the said sleeve there is a jaw, $d$, which clutches with a projection, $v$, on this end of the tool-holder spindle, $x$, the said sleeve thus constructed forming a reversible clutch, the jaws $l\,l'$ clutching, when the tool-holder is revolved in the direction that the spindle turns to run the die, upon the screw to cut the thread, and the jaw $d$ clutching the projection $v$ when the spindle is revolved in the opposite direction to run the die off the screw after it is threaded.

In cutting screw-threads with a tap the tap may be confined by its shank in a simple socket by means of a set-screw having a spindle corresponding to that of the die-tool holder, and furnished in like manner with clutching-jaws or equivalent projections to $l'$ and $v$, both constituting a tool-holder, and operating in combination with the reversible clutch as follows: The jaws $l\,l'$ are clutched and the die $p$ is started, cutting upon the end of the rod G, and as the die advances thereon the tool-holder and its jaw $l'$ are drawn away from the jaw $l$ on the clutch until the thread has been cut to a given point, when the jaw $l'$ slides past and escapes from the clutch of the jaw $l$, and the tool-holder, being thus released, revolves with the spindle and threaded screw in the sleeve of the clutch until the revolution of the spindle D is reversed, when the jaw $d$ and projection $v$ clutch each other and arrest the revolution of the tool-holder, and cause the withdrawal of the die from the threaded screw, the projection $v$ sliding past, and escaping from the clutch of the jaw $d$ in so doing, as the die is withdrawn.

What I claim, and desire to secure by Letters Patent, is—

1. The combination of a set of griping-jaws, $l$, and a set of wedges on a sliding rod or tube, $m$, or its equivalent, with a hollow screw, F, the same being constructed and arranged to operate within a revolving spindle, substantially as described, for the purpose specified.

2. The combination of the threading-tool holder and the reversible clutch, constructed and arranged to co-operate with a revolving spindle, substantially as described, for the purpose specified.

JOS. R. BROWN.

Witnesses:
ISAAC A. BROWNELL,
WILLIAM BROWNELL.